United States Patent
Schuellein

(10) Patent No.: US 7,777,460 B2
(45) Date of Patent: *Aug. 17, 2010

(54) MULTI-PHASE CONVERTER WITH IMPROVED CURRENT SHARING

(75) Inventor: George Schuellein, Narragansett, RI (US)

(73) Assignee: International Rectifier Corporation, El Segundo, CA (US)

(*) Notice: Subject to any disclaimer, the term of this patent is extended or adjusted under 35 U.S.C. 154(b) by 236 days.

This patent is subject to a terminal disclaimer.

(21) Appl. No.: 11/870,160

(22) Filed: Oct. 10, 2007

(65) Prior Publication Data

US 2008/0089101 A1    Apr. 17, 2008

Related U.S. Application Data

(63) Continuation-in-part of application No. 11/761,727, filed on Jun. 12, 2007, now Pat. No. 7,573,245, which is a continuation-in-part of application No. 11/530,957, filed on Sep. 12, 2006, now Pat. No. 7,492,136.

(60) Provisional application No. 60/814,850, filed on Jun. 19, 2006, provisional application No. 60/717,841, filed on Sep. 16, 2005.

(51) Int. Cl.
*G05F 1/59* (2006.01)

(52) U.S. Cl. .................. 323/272; 323/283; 363/65

(58) Field of Classification Search .................. 323/283, 323/222, 224, 282, 284–290, 272–274, 269; 363/21.15, 89, 95, 97, 127, 131, 132, 65; 307/65–66

See application file for complete search history.

(56) References Cited

U.S. PATENT DOCUMENTS 6,965,219 B2 * 11/2005 Brooks et al. ............... 323/282

* cited by examiner

*Primary Examiner*—Rajnikant B Patel
(74) *Attorney, Agent, or Firm*—Farjami & Farjami LLP

(57) ABSTRACT

A multi-phase converter has a plurality of switching circuits each controlled by a phase controller and each providing a switched output voltage to an output node of the converter. Each switching circuit sequentially provides a switched output voltage to the output node at which an output voltage of the converter is developed. A clock circuit provides a plurality of out of phase clock signals to determine when each switching circuit provides the switched voltage to the output node. Each switching circuit is connected across a DC bus voltage. A first error amplifier compares a first signal proportional to the output voltage of the converter at the output node with a second signal comprising a first reference voltage and produces a first error signal. A PWM generator compares the first error signal with a third signal comprising a ramp signal from a ramp signal generator circuit and produces a pulse width modulated signal to control the on-times of a switch of the connected switching circuit. A current share adjusting circuit has a current sense amplifier for each switching circuit sensing the output current provided by each switching circuit, and provides a signal proportional to the sensed output current.

20 Claims, 10 Drawing Sheets

MULTI-PHASE CONVERTER WITH IMPROVED CURRENT SHARING

CROSS-REFERENCE TO RELATED APPLICATIONS

This application is a continuation-in-part of U.S. application Ser. No. 11/761,727 filed Jun. 12, 2007 entitled MULTI-PHASE CONVERTER WITH FREQUENCY AND PHASE TIMING CONTROL, which in turn is a continuation-in-part of U.S. application Ser. No. 11/530,957 filed Sep. 12, 2006 entitled MULTI-PHASE CONVERTER WITH IMPROVED LOAD STEP-UP TRANSIENT RESPONSE, and which claims the benefit and priority of U.S. Provisional Application Ser. No. 60/717,841 filed Sep. 16, 2005, the entire disclosure of which is incorporated by reference herein. Said U.S. Ser. No. 11/761,727 claims the benefit and priority of U.S. Provisional Application 60/814,850 filed Jun. 19, 2006, the entire disclosure of which is incorporated by reference herein.

BACKGROUND OF THE INVENTION

The present invention relates to DC to DC converters, and in particular, to multi-phase converters which produce a DC output voltage at the common output of a plurality of coupled switching power supplies, for example, a plurality of buck converters.

Multi-phase converters are known. In a typical multi-phase converter, for example, a multi-phase buck converter, a plurality of buck converters are provided each having their output inductors coupled to the output node. In a typical application, each buck converter is controlled by a control circuit and may be operated such that a control switch of each buck converter switching stage is turned on at a different time than the other phases. In this way, each phase sequentially provides power to the load, reducing ripple and reducing the size of the output capacitance.

With multi-phase converters, it is desirable to be able to control the current provided by each phase, and in particular, so that the currents provided by each phase are equal so that no phase provides too great a current compared to the other phases. This contributes to increased efficiency, longer component life and prevents device destruction.

SUMMARY OF THE INVENTION

Accordingly, it is an object of the present invention to provide a multi-phase converter which provides a means for adjusting the current in each phase to equalize the currents.

In accordance with the invention, a multi-phase converter is provided comprising a plurality of switching circuits each controlled by a phase controller and each providing a switched output voltage to an output node of the converter and wherein each switching circuit under control of the phase controller sequentially provides a switched output voltage to the output node at which an output voltage of the converter is developed; a clock circuit for providing a plurality of out of phase clock signals to determine when each switching circuit provides the switched output voltage to the output node; each switching circuit connected across a DC bus voltage, further comprising a first error amplifier comparing a first signal proportional to the output voltage of the converter at the output node with a second signal comprising a first reference voltage and producing a first error signal; and a PWM generator circuit comparing said first error signal with a third signal comprising a ramp signal from a ramp signal generator circuit and for producing a pulse width modulated signal to control the on-times of a switch of the connected switching circuit, further comprising a current share adjusting circuit, the current share adjusting circuit comprising a current sense amplifier for each switching circuit sensing the output current provided by each switching circuit, and providing a signal proportional to the sensed output current; a current share adjust error amplifier having said signal proportional to the sensed output current as a first input and having a signal proportional to an average current provided by each of the switching circuits and for producing a current share adjust signal; and said ramp signal generator circuit producing said ramp signal, said ramp signal generator circuit receiving said current share adjust signal and adjusting the ramp signal to affect the duty of cycle of the pulse width modulated signal to move the output current of the connected switching circuit toward the average current.

In an embodiment, the current share adjust signal adjusts the charge on a capacitor charging from a voltage source such that if the output current of a switching circuit is smaller than the average current, the charge on the capacitor is reduced thereby pulling down the starting point of the ramp signal thereby increasing the PWM duty cycle and output current and if the output current of the connected switching circuit is larger than the average current, the charge on the capacitor is increased thereby pulling up the starting point of the ramp signal thereby decreasing the PWM duty cycle and the output current.

Other objects, features and advantages of the invention will be apparent from the detailed description which follows.

BRIEF DESCRIPTION OF THE DRAWING(S)

The invention will now be described in greater detail in the following detailed description with reference to the drawings in which.

DETAILED DESCRIPTION OF PREFERRED EMBODIMENTS OF THE INVENTION

Figure 1A:
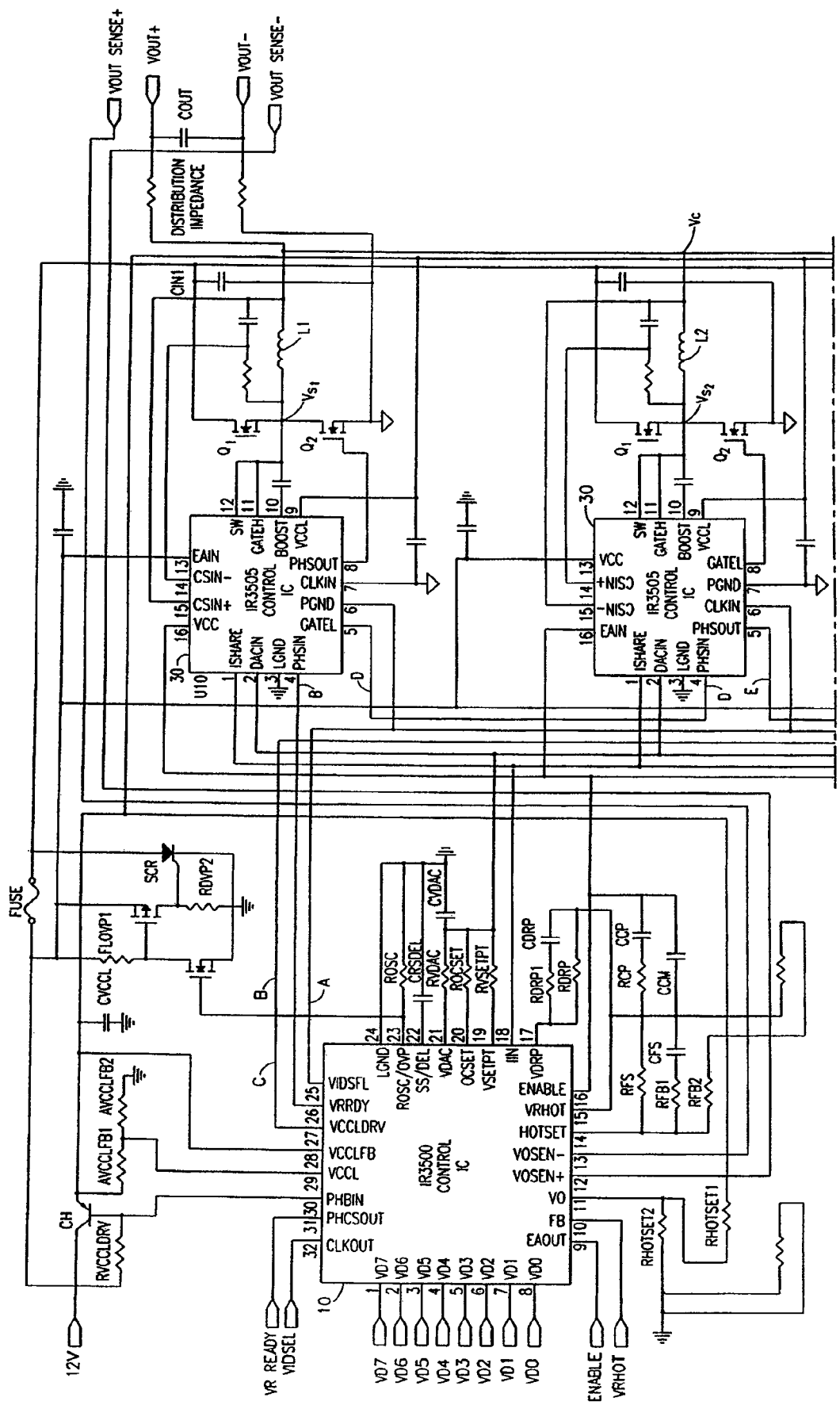
FIG. 1 shows a six-phase multi-phase converter to which the invention is applied.
Figures 1, 1B:
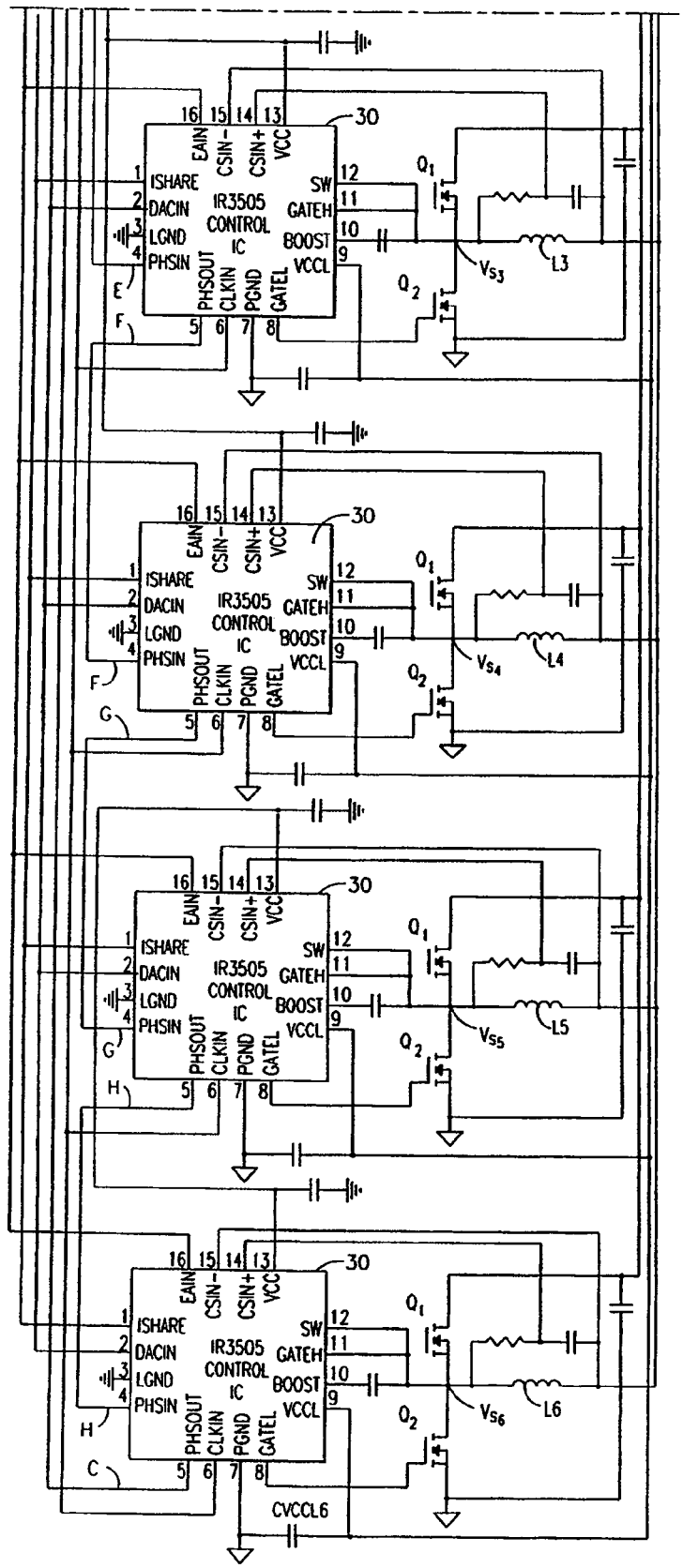
Figure 2:
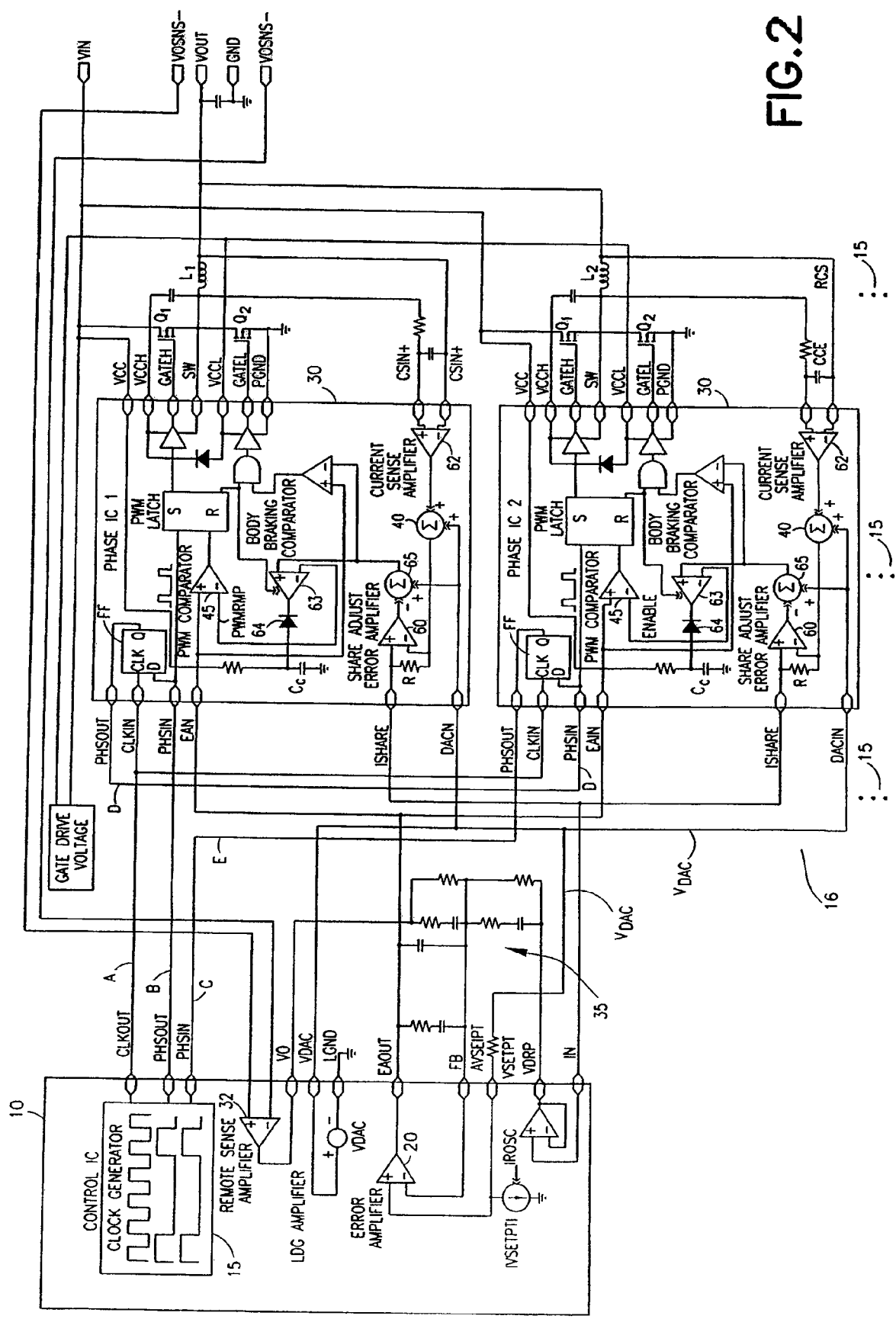
FIG. 2 shows in greater detail the multi-phase converter of FIG. 1 showing only two phases in detail.

With reference to the drawings, FIGS. 1 and 2 show a multi-phase converter implementing the invention. FIG. 2 shows greater details of the circuit of FIG. 1 only showing two phase controllers 30 (phase ICs) in detail, which are identical. Each phase IC 30 controls a buck converter (switching circuit) comprising two transistors Q1 and Q2 and an output inductor $L_N$. Transistor Q1 is the control switch and transistor Q2 is the synchronous switch. The synchronous switch can be replaced by a diode, as well known to those of skill in the art, although the use of a synchronous switch provides greater efficiency.

FIG. 1 shows an example of a six-phase multi-phase converter which employs the IR3500 control integrated circuit 10 and a plurality, in the six-phase case shown, six IR3505 phase ICs 30 which are controlled by the control IC. Each phase IC 30 is identical and has outputs connected to a respective buck converter comprising two switches, an upper switch Q1 functioning as the control switch and the lower switch Q2 functioning as a synchronous switch. The switch node $V_S$ 1-6 of each respective phase is connected to an output inductor L1 through L6 for each of the phases which are connected at a common node VC and coupled to an output node VOUT+ through any distribution impedance present. An output capacitor COUT is coupled across the output to filter the switched output voltage.

Figure 3:
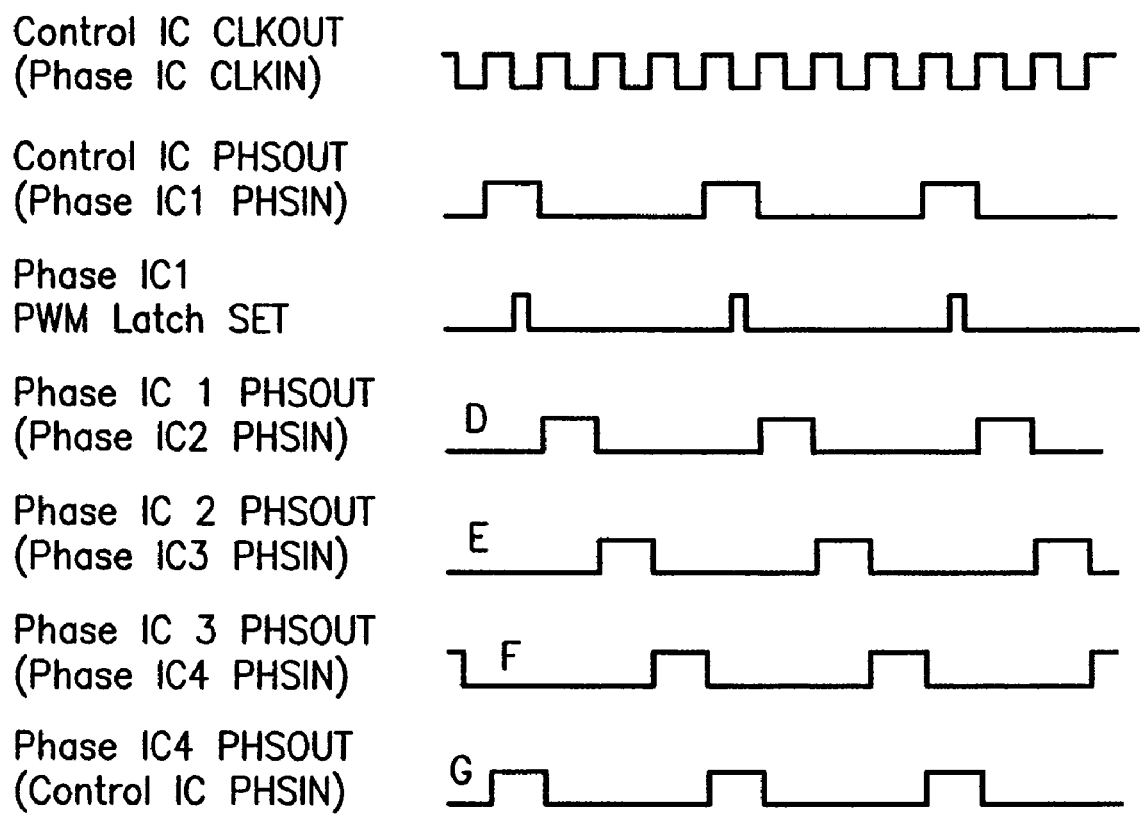
FIG. 3 shows waveforms in FIG. 2 for four phases.

In the multi-phase converter, each control switch Q1 is turned on to provide output current to charge the output inductor to provide current to the load at a time determined by a clock pulse which may be provided by the control IC. The clock pulses for each phase IC (labeled PHSIN) are shown in FIG. 3. As shown, there is a time delay between the PHSIN signals (IC1 PHSIN, IC2 PHSIN, IC3 PHSIN, IC4 PHSIN so that the respective phase control switches Q1 are turned on out of phase from each other. The turn-on of the synchronous switches Q2 are likewise delayed, but turn on in complementary manner to the control switches.

Figure 4:
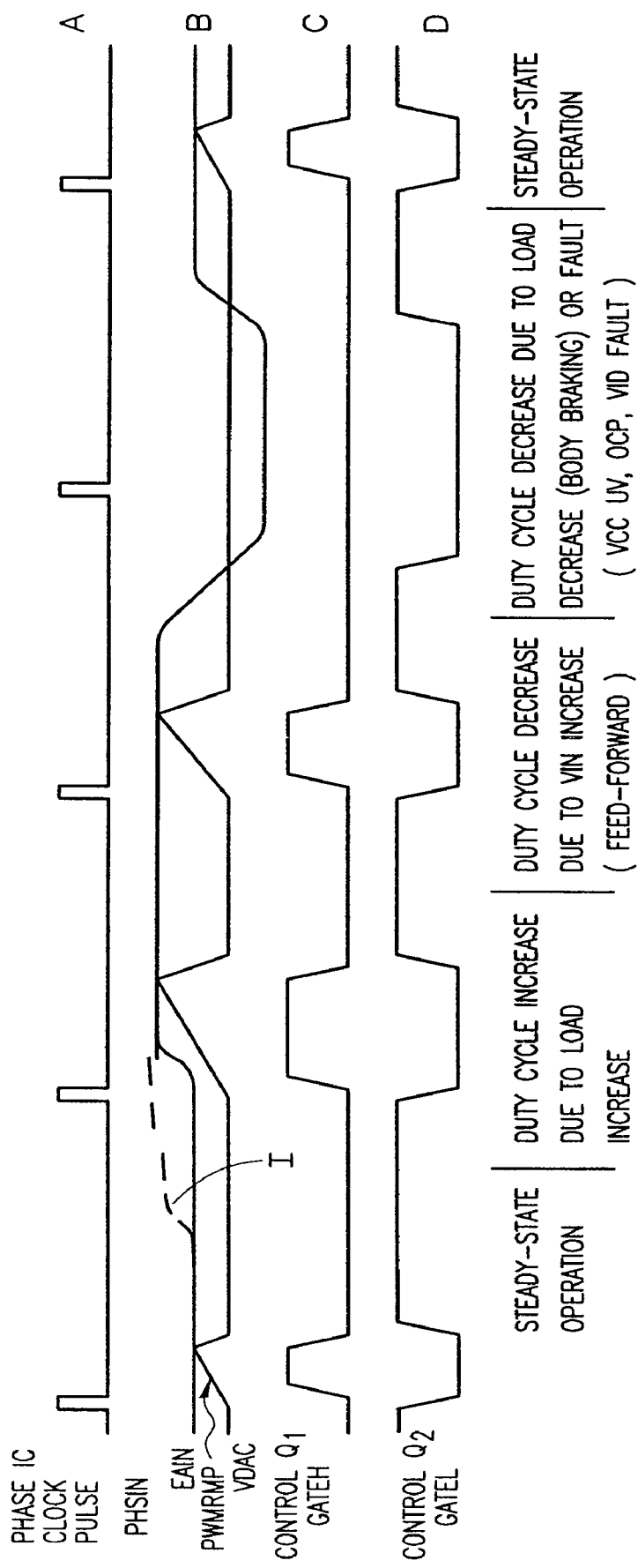
FIG. 4 shows waveforms in FIG. 2.

With reference to FIG. 2 which shows in greater detail the circuit of FIG. 1, although showing only two phase ICs 30, a clock pulse is provided at CLKOUT from the clock circuit 15 of control IC 10. As shown in FIG. 4, at A, and with reference to FIG. 2, when a clock pulse occurs, this starts a ramp signal PWMRMP, which is shown at the non-inverting input of the PWM comparator 45 in FIG. 2. It also turns on the control switch Q1. See C of FIG. 4. PWMRMP is shown in waveform B of FIG. 4. The base level for the PWM ramp is a signal $VDAC^1$ which is provided by the control IC 10 based on a reference voltage VDAC level set by VID signals VID0 to VID7. See FIG. 1. VDAC is the reference level that determines the voltage output of the converter. VDAC is provided to the non-inverting input of error amplifier 20, where it is compared to a feedback voltage FB from the converter output. The error amplifier 20 produces an error amplifier signal EAOUT. See FIG. 2. EAOUT is provided to PWM comparator 45 to be compared to a ramp signal PWMRMP.

When PWMRMP equals the output of error amplifier 20 in the control IC 10, which compares feedback FB from the output voltage of the converter against the reference voltage VDAC, as shown in FIG. 2, the control or high side switch Q1 is turned off and the low or synchronous switch Q2 is turned on. See waveforms C and D of FIG. 4. As shown, the control or high side switch Q1 is turned on when the clock pulse occurs and turned off when the ramp voltage equals the error amplifier 20 output. This is shown for a range of error amplifier signals in FIG. 4B. As shown, when the error amplifier 20 output increases due to a load step-up as shown at I in FIG. 4B, the control switch Q1 is turned on when the clock pulse occurs and is turned off when the PWM ramp voltage has reached the error amplifier output EAIN. A shown in FIG. 4, the increased error amplifier output results in increased Q1 duty cycle. The duty cycle accordingly follows the error amplifier signal and once the error amplifier signal decreases due to, for example, a load decrease, the duty cycle is reduced, as shown in FIG. 4C.

Although FIGS. 1 and 2 show a separate control integrated circuit 10 and phase integrated circuits 30, the circuit can be implemented as a single integrated circuit or as discrete circuitry or with any number of ICs, e.g., all phases in one IC, for example.

As shown in FIGS. 1 and 2, the control IC 10 provides a clock signal CLKOUT, as shown in FIG. 3, to each of the phase ICs at the respective input CLKIN. Dotted lines 15 in FIG. 2 show that additional phases or phase ICs can be employed depending upon the load requirements, in which case the signal lines 16 would extend to the additional phase ICs.

Two lines from the control IC 10, CLKOUT (A) and PHASE OUT (B) (PHSOUT) and a return line PHASEIN (C) plus ground are provided via a daisy-chain arrangement of the control ICs 30 to set the frequency of operation and phase timing of the phase ICs 30.

As shown in FIGS. 1, 2 and 3, slave clock signal CLKOUT (A) is provided to each phase IC 30 as CLKIN. In addition, a lower frequency signal master clock PHSOUT (B) is provided to the first phase IC as PHSIN which is the clock signal which sets the PWM frequency of the phase IC. The first phase IC provides a signal PHSOUT (D) which is provided to the input of the next phase IC to provide a delayed clock signal PHSIN to that phase IC. This is shown in greater detail in FIG. 1 for a six-phase converter. Each phase IC 30 provides a delayed phase timing signal to the next phase IC in a daisy-chain arrangement. The last phase IC provides a PHSOUT signal (E in FIG. 2) back to the control IC 10. In the six converter arrangement of FIG. 1, this is indicated by line C. Note that in each successive converter, the signals (D, E, F, G, H and C) are delayed by one clock period of CLKIN from the immediately preceding converter by a flip-flop FF (see FIG. 2). FIG. 3 shows the successively delayed signals (D, E, F and G) for a four phase converter.

The sequentially out of phase clock signals PHSIN to each phase IC are provided to each of the phase ICs to control the respective on times of the control and synchronous switches of each of the respective buck converters. FIG. 3 shows the sequentially delayed clock signals PHSIN for each of four phase ICs, phase IC1 through phase IC4. As can be seen in FIG. 3, each of the clock signals PHSIN for each phase IC is delayed sequentially to provide the out of phase timing control for turning on the respective switches Q1 and Q2 of each phase.

FIG. 4, as already described, shows the phase IC clock pulse PHSIN for a single phase and exemplary PWM ramp and error amplifier EAIN signals and the gate output signals for the control and synchronous (SYNC) switches.

In order to provide the two clock signals from the control IC 10, two oscillators in the clock circuit 15 are provided in the control IC in a master-slave arrangement. This is shown in detail in FIG. 7. The master oscillator 150 operates at the switching frequency of the converters, that is, the switching frequency of the PHSIN signals. A slave oscillator 152 oscillates at a frequency X times the master frequency, where X is the number of phases. Accordingly, the clock frequency CLK is set as the slave frequency, X times the master frequency, which is determined by the number of phase ICs. This is automatically determined by the control IC based on the time delay, equal to a predetermined number of clock pulses delay caused by the cumulative delays in each phase IC. This is accomplished by sending out a pulse train on PHSOUT (B) and determining the phase delay at PHSIN (C). See FIGS. 1 and 2.

Figure 7:
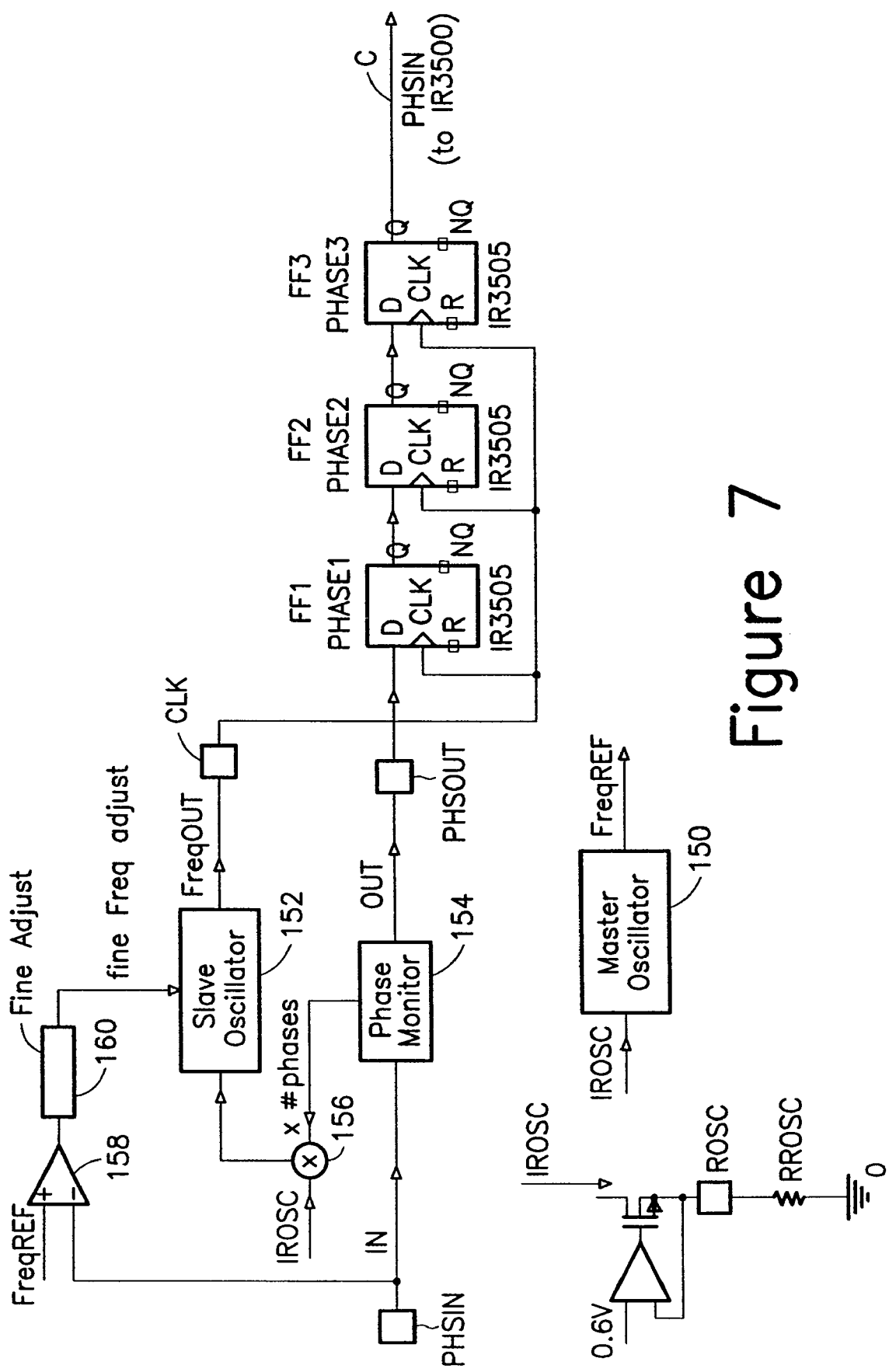
FIG. 7 shows the main control circuit and in particular, the clock circuit.

With reference to FIG. 7, the delay circuits FF1 to FF3 (for a three phase converter) in each phase controller 30 are illustrated in the daisy chain arrangement. Each FF receives the high frequency slave, clock signal CLK. FF1 receives the lower frequency signal PHSOUT at its D input, which is clocked in FF1 by CLK to FF2 and then to FF3, etc., as previously described.

PHSOUT is developed as follows. Master oscillator 150 (FIG. 7) produces FreqREF from an oscillator current source IROSC, determined by RROSC. Current IROSC is provided to a multiplier stage 156. A phase monitor 154 monitors PHSIN (C) from the last phase controller FF to determine the number of phases X. Multiplier 156 multiplies the number of phases X by Current IROSC, which is input to the slave oscillator 152 to determine the slave oscillator frequency FreqOUT, which is provided as the high frequency clock signal CLK. FreqREF is used to provide a fine frequency adjustment of CLK via comparator 158 and fine adjustment stage 160. Accordingly, the oscillator 152 is slaved to the master 150.

Figure 8:
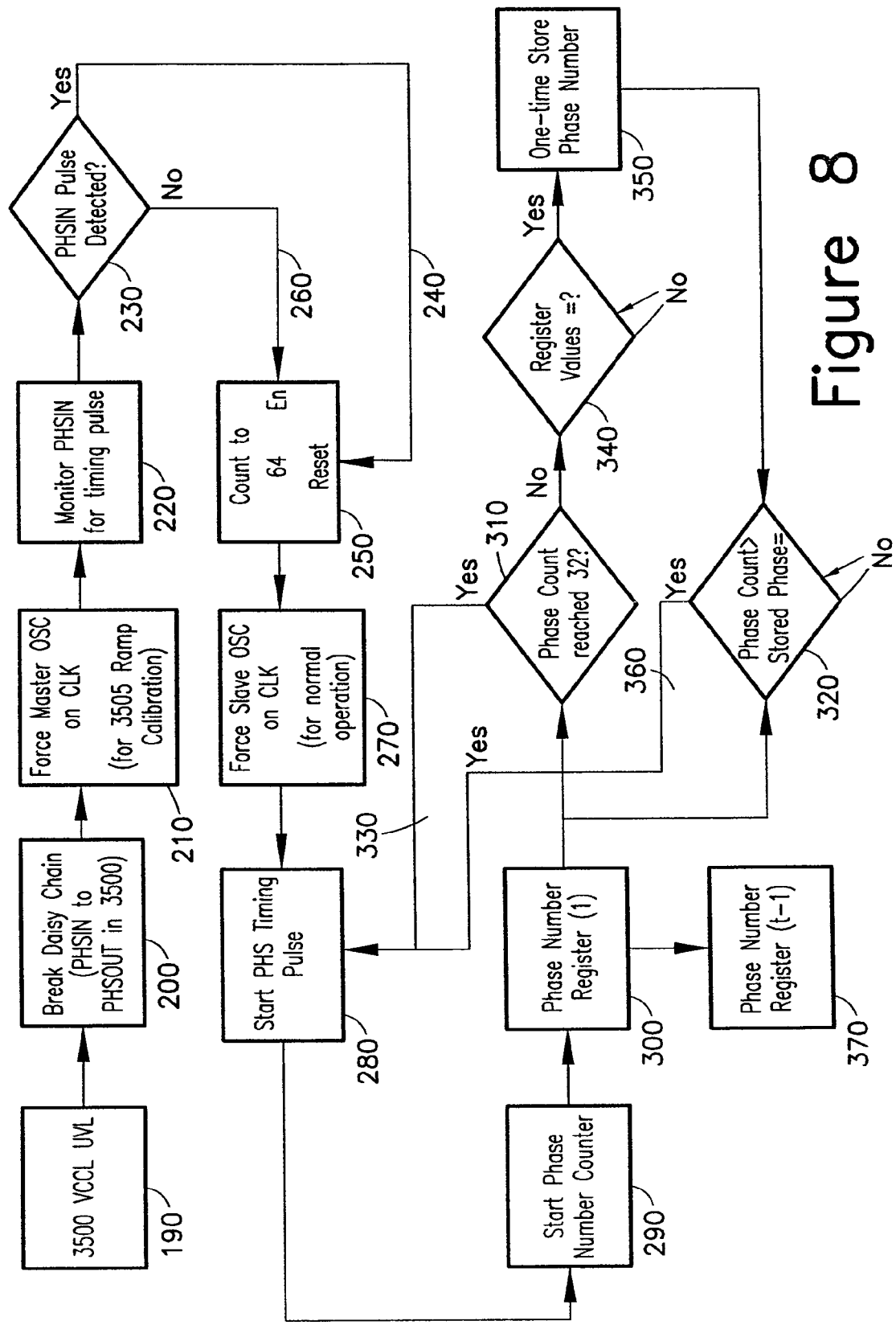
FIG. 8 shows the main control circuit at power up phase start.

FIG. 8 shows how the number of phases are determined. The number of phases is determined at power-up. First, on power up, when under voltage UVL is high (190), the daisy chain is interrupted (200). The master oscillator 150 is forced on the clock (210) for ramp calibration. Then PHSIN is monitored for a timing pulse (220,230). If the pulse is detected, a counter is reset (240,250). If the pulse is not detected, the counter is enabled (260,250). The slave oscillator is forced on the clock (270). The PHS timing pulse is then generated (280). A phase number counter 250 is started at 290 and the phase number register (t), (t−1) (300,301) is monitored (310, 320) for the phase count. If the phase count is 32, the timing is restarted (330). If not, the register values are checked for equality (340). If yes, the phase number X is stored (350), and checked at 320 to determine if the phase count is greater than the stored phase number. If yes (360), a new phase timing pulse is generated (280). When UVL (under voltage lockout) goes low, the operation in FIG. 8 is discontinued and normal daisy chain operation occurs. At this time, the number of phases X will have been determined and the oscillator 152 will be slaved to the master 150 at X times the frequency of oscillator 150.

A circuit is further employed which determines if the error amplifier voltage is above a reference voltage by a prescribed amount. If the error amplifier output voltage exceeds the reference voltage by the prescribed amount, the gate signal for the control switch is turned on immediately and the gate signal for the synchronous switch is turned off. This can be done for a single phase or, preferably, the control switches for all phases are turned on at the same time thus providing an immediate burst of power to satisfy the load requirements.

Figure 5:
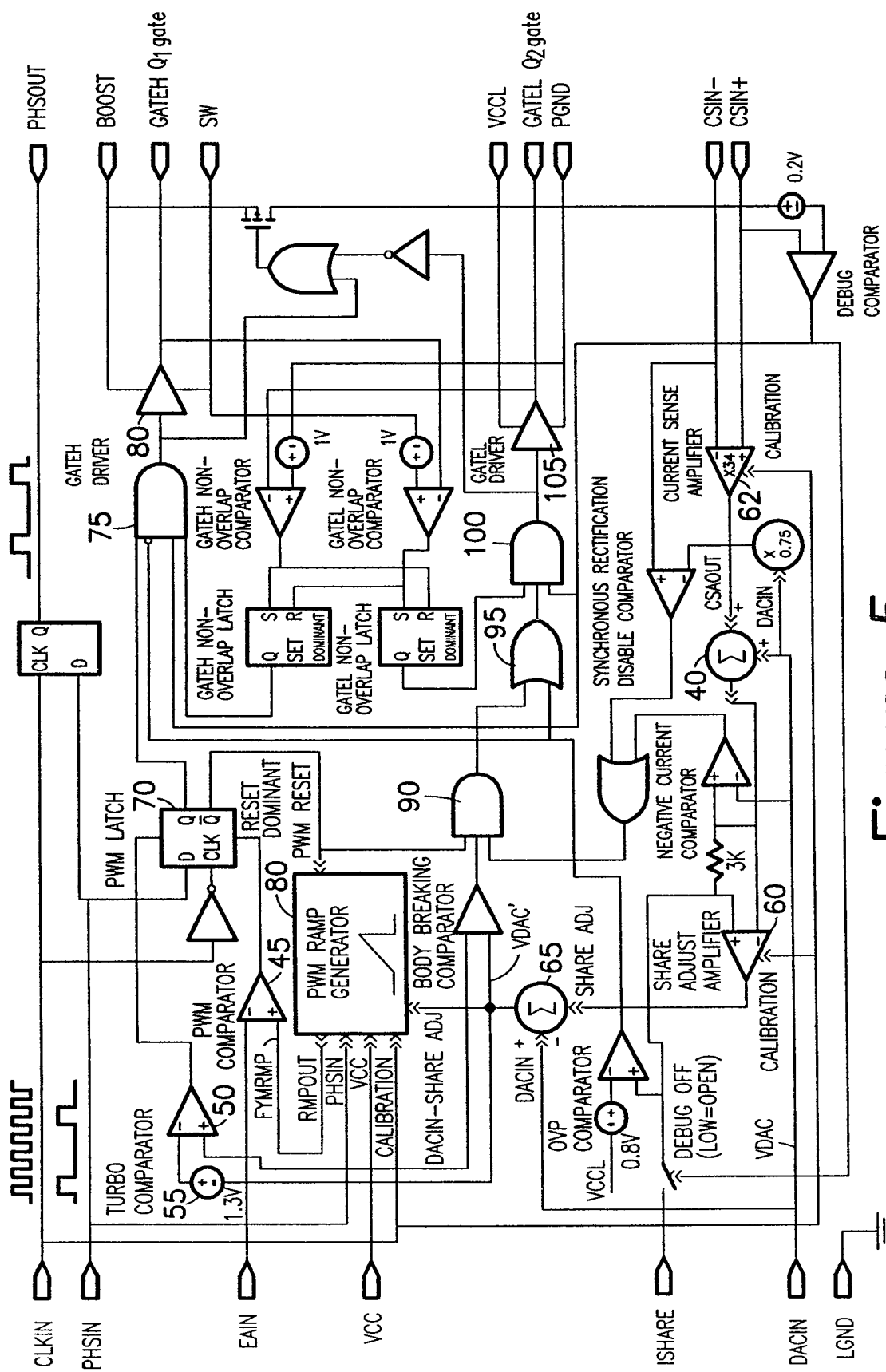
FIG. 5 shows a detailed block diagram of one phase control circuit for controlling a buck converter output stage.
Figure 6:
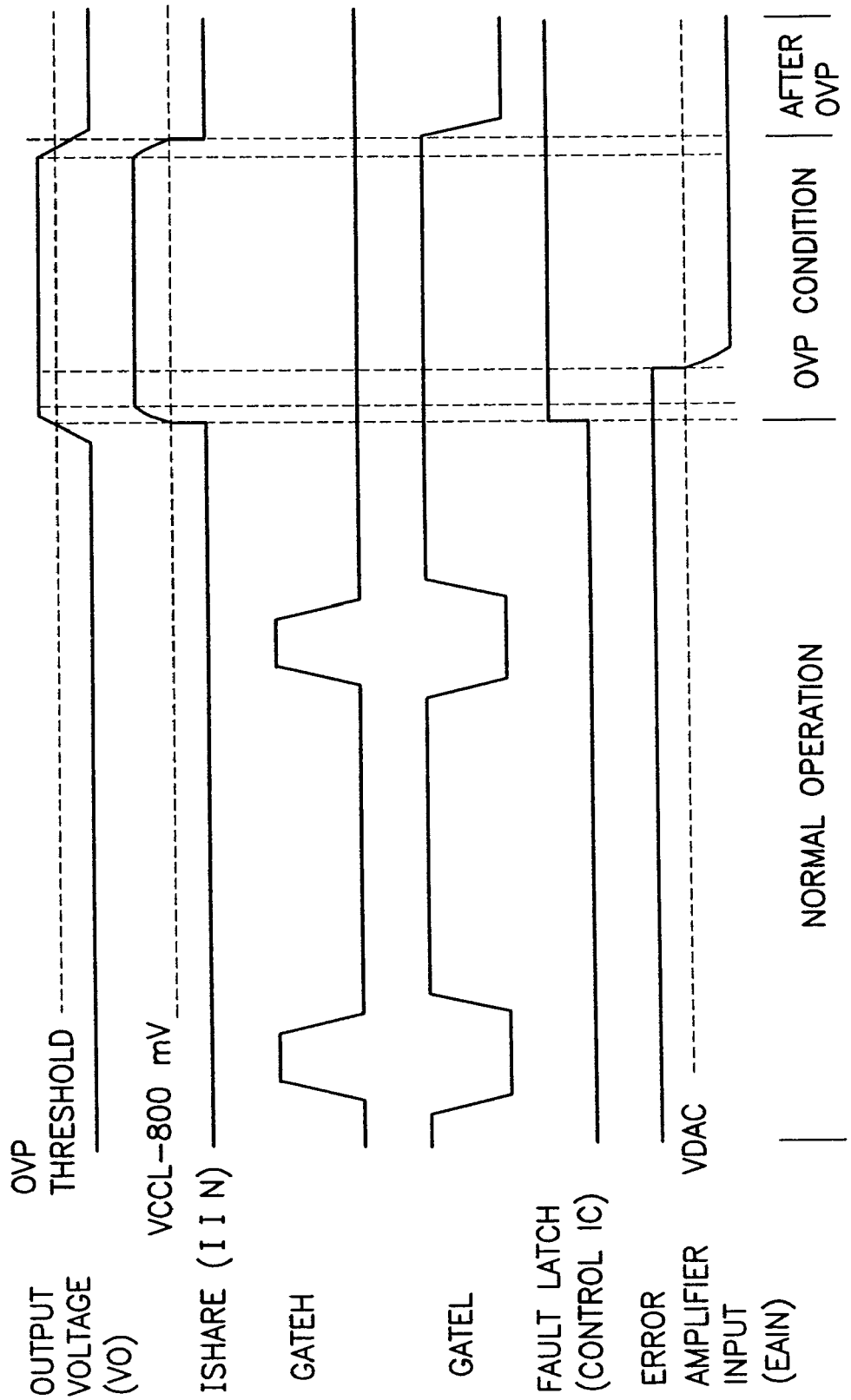
FIG. 6 shows waveforms of the circuit of FIG. 5.

With reference to FIGS. 2, 5 and 6, in normal operation, the output voltage VOUT is monitored by an error amplifier 20. See FIG. 2. The error amplifier 20, shown in the control IC 10, receives a signal FB from the remote sense amplifier 32 which senses the output voltage across terminals VOSENSE+ and VOSENSE− and produce an output $V_O$. This output $V_O$ (FIG. 2) is provided through a voltage divider circuit 35 to the inverting input of the error amplifier 20. The non-inverting input of the error amplifier 20 is provided with a signal VDAC provided at the input VSETPT. This sets the desired converter output voltage. VDAC is itself the output of a digital to analog converter in control chip 10 which receives digital inputs VID0 to VID7 from a microprocessor to set the output voltage. The output of the error amplifier EAOUT represents the deviation of the output voltage from the reference VDAC. This error amplifier signal, shown as EAIN at the input of the phase ICs 30, is compared in each phase IC by a PWM comparator 45 to a ramp voltage PWM RMP which begins as shown in FIG. 4 when the clock pulse PHSIN occurs. When the clock pulse occurs, the PWM latch 70 is set turning on the control switch Q1. The synchronous switch Q2 is turned off slightly before the control switch Q1 is turned on to avoid shoot-through. Once the ramp voltage equals the error amplifier voltage, the PWM comparator 45 output resets the PWM latch 70, turning off the control switch Q1 and turning on the synchronous switch Q2 after a small time delay, again to prevent shoot-through.

FIG. 6 shows the operation of the circuit of FIG. 5 which shows greater details of the circuit of FIG. 2. There is a current sense amplifier 62 in each phase IC 30 which monitors the current in the output inductor for that phase. The output of the current sense amplifier 62 is summed with the voltage VDAC (DAC IN) in a summing stage 40 and compared to an average current signal ISHARE in a share adjust error amplifier 60. The average current signal is produced by providing the output of summing stage 40 (proportional to output current of a phase) through a resistor R (FIG. 2) to the node ISHARE. This results in a voltage proportional to the average current on node ISHARE. The share adjust error amplifier 60 has a first input comprising the average current signal ISHARE and a second signal proportional to the phase current. The output of amplifier 60 is thus proportional to the difference between the average current and the phase current. The output of the share adjust error amplifier 60 is provided to a difference stage 65 and then to amplifier 63 which adjusts the charge rate of a charging capacitor Cc to adjust that phases' share of the total output current. Amplifier 63 and capacitor Cc form a PWM ramp generator 80 (FIG. 5). The charge rate of capacitor Cc will affect the ramp signal waveshape. For example, if the current sensed in the particular phase is higher than the average (ISHARE), the PWM ramp generator 80 will adjust the PWM ramp to reduce the current in that phase to bring it closer to the average. This is done in each of the phase ICs so that each phase shares equally in the total current supply to the load.

In particular, if current in a phase is smaller than the average current, the share adjust amplifier 60 of the phase, operating on amplifier 63, will pull down the starting point of the PWM ramp thereby increasing its duty cycle and output current. If current in a phase is larger than the average current, the share adjust amplifier of the phase will pull up the starting point of the PWM ramp thereby decreasing its duty cycle and output current. The current share amplifier is internally compensated so that the crossover frequency of the current share loop is much slower than that of the voltage loop and the two loops do not interact.

Thus, amplifier 63 will affect the charge rate into capacitor Cc. The more diode 64 is forward biased by the output of amplifier 63, the more the ramp signal is pulled down and hence duty cycle increased (that is the ramp signal will reach the error amplifier output later. See FIG. 4). As diode 64 becomes reverse biased, the less the ramp signal will be pulled down and hence the duty cycle will be decreased (that is, the ramp signal will reach the error amplifier output sooner. See FIG. 4).

As shown in FIG. 6, a response of the circuit to an overvoltage in the output voltage (over voltage protection—OVP) is shown whereby when the output voltage exceeds the OVP threshold, a fault latch in the control IC is operated causing the control switch Q1 not to be turned on for the next clock pulse resulting in the error amplifier output EAIN to the phase ICs reducing to reduce the output voltage.

Figure 6A:
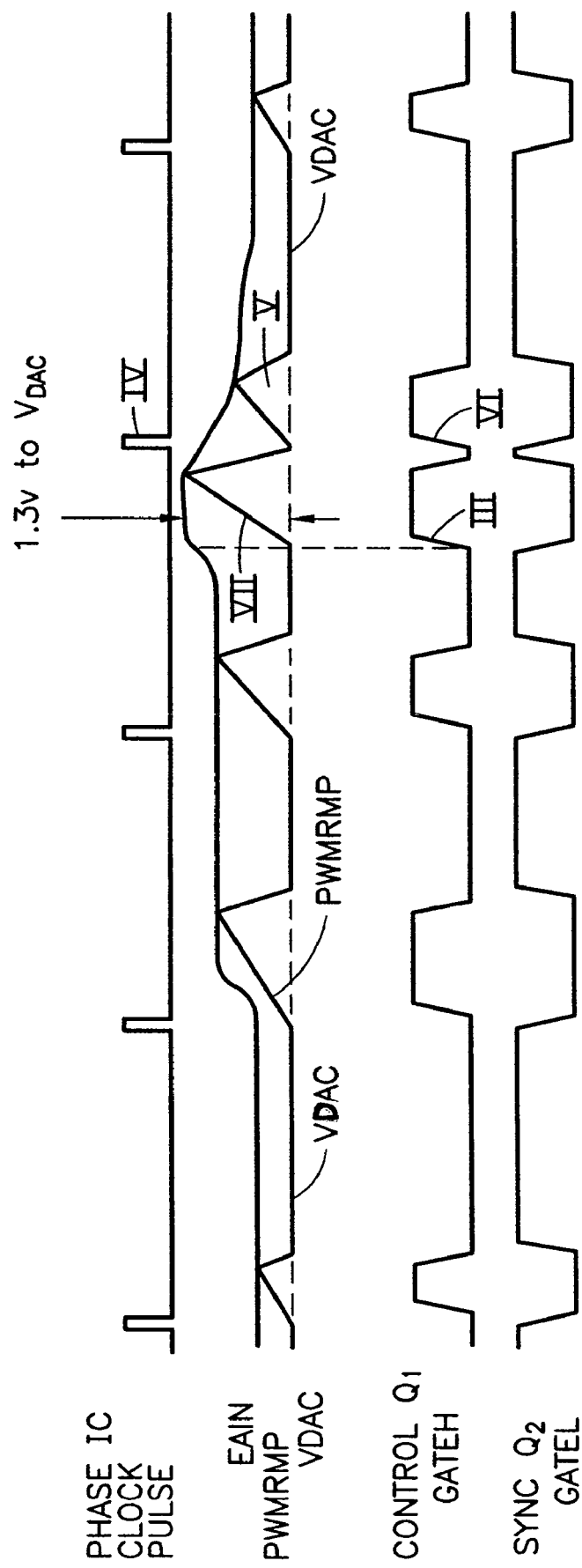
FIG. 6A shows the response to a stepped up load transient.

FIG. 6A shows the response of the circuit to a stepped-up load transient. When a stepped-up load transient occurs, the error amplifier output voltage will increase because the converter output voltage will decrease. If the output voltage EAIN of the error amplifier 20 exceeds a prescribed amount, as shown in FIG. 7, illustratively 1.3 volts above a reference voltage $VDAC^1$, a comparator 50 (having a reference 55 voltage of illustratively 1.3 volts above the voltage $VDAC^1$, which is in turn set by the share adjust amplifier 60, via a summing stage 65) output goes high setting the PWM latch 70. Note that VDAC$^1$ is a modified form of VDAC, as it is adjusted by the output of the share adjust amplifier 60. If the share adjust amplifier 60 is not present then VDAC and VDAC$^1$ are the same. The setting of PWM latch 70 forces the output gate H, which is the gate of the control switch Q1, high via gate 75 and the driver 80. Slightly before this time, the complementary output of the PWM latch 70 resets the PWM ramp generator 80 and via gates 90, 95, 100 and the gate driver 105, turns off the synchronous switch Q2.

This is shown in FIG. 6A where the gate signal to the control switch (gate H) is turned on at III prior to the clock signal pulse at IV. As shown in FIG. 6A, once the clock signal occurs, the PWM ramp begins again, as shown at V, turning on the control switch as shown at VI.

In order to prevent the high side switch Q1 from conducting too long, the PWM ramp slope is increased, e.g., doubled, during this mode of operation. This is shown by the increased slope at VII in FIG. 6A. The phase IC 30 comes out of this mode once the PWM ramp signal rises above the error amplifier output.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A multi-phase converter comprising:
a plurality of switching circuits each controlled by a phase controller and each providing a switched output voltage to an output node of the converter and wherein each switching circuit under control of the phase controller sequentially provides a switched output voltage to the output node at which an output voltage of the converter is developed; a clock circuit for providing a plurality of out of phase clock signals to determine when each switching circuit provides the switched output voltage to the output node; each switching circuit connected across a DC bus voltage, wherein each of said switching circuits further comprises a first error amplifier comparing a first signal proportional to the output voltage of the converter at the output node with a second signal comprising a first reference voltage and producing a first error signal; and a PWM generator circuit comparing said first error signal with a third signal comprising a ramp signal from a ramp signal generator circuit and for producing a pulse width modulated signal to control the on-times of a switch of the connected switching circuit, further comprising a current share adjusting circuit, the current share adjusting circuit comprising:
a current sense amplifier for each switching circuit sensing the output current provided by each switching circuit, and providing a signal proportional to the sensed output current;
a current share adjust error amplifier having said signal proportional to the sensed output current as a first input and having a signal proportional to an average current provided by each of the switching circuits and for producing a current share adjust signal; and
said ramp signal generator circuit producing said ramp signal, said ramp signal generator circuit receiving said current share adjust signal and adjusting the ramp signal to affect the duty cycle of the pulse width modulated signal to move the output current of the connected switching circuit toward the average current.

2. The multi-phase converter of claim 1, wherein the current share adjust signal adjusts the charge on a capacitor charging from a voltage source such that if the output current of the connected switching circuit is smaller than the average current, the charge on the capacitor is reduced thereby pulling down the starting point of the ramp signal thereby increasing the PWM duty cycle and output current and if the output current of the connected switching circuit is larger than the average current, the charge on the capacitor is increased thereby pulling up the starting point of the ramp signal thereby decreasing the PWM duty cycle and the output current.

3. The multi-phase converter of claim 1, wherein each switching circuit comprises a buck converter comprising first and second series connected switches connected across the DC bus voltage with a switched node therebetween and having an output inductor coupling the switched node to the converter output node.

4. The multi-phase converter of claim 1, wherein the phase controllers and the main control circuit are formed as a single integrated circuit.

5. The multi-phase converter of claim 1, wherein the phase controllers and the main control circuit are separate integrated circuits.

6. The multi-phase converter of claim 1, wherein the average current signal is produced by providing the output signal of each current sense amplifier to a common node through a resistance.

7. The multi-phase converter of claim 6, wherein the ramp signal generator circuit comprises a capacitor charged from a voltage source and an amplifier having one input comprising the output of said current share adjust error amplifier and a second input comprising the voltage on said capacitor and wherein said amplifier causes the charge on said capacitor to change to affect the starting point of said ramp signal.

8. The multi-phase converter of claim 7, wherein said capacitor is coupled to an output of said amplifier by a diode allowing said capacitor to discharge into said amplifier when said diode is forward biased.

9. A phase current adjuster to adjust a phase current of a phase of a multi-phase converter, said phase current adjuster comprising:
a first comparison circuit to produce a differential signal based on a comparison of said phase current with an average current of said multi-phase converter; and
a ramp comparison circuit configured to adjust said phase current based on a second comparison of said differential signal and a clocked ramp signal.

10. The phase current adjuster of claim 9, wherein said ramp comparison circuit is further configured to change a duty cycle of a pulse width modulator based on said second comparison of said differential signal and said clocked ramp signal.

11. The phase current adjuster of claim 10, wherein said ramp comparison circuit is further configured to switch a switch of said pulse width modulator.

12. The phase current adjuster of claim 9, wherein said ramp comparison circuit is configured to substantially equalize said phase current and said average current.

13. The phase current adjuster of claim 9, further comprising:
a delay circuit comprising a logic circuit connected as part of a daisy-chain configuration to another phase of said multi-phase converter;
said delay circuit configured to provide a delayed phase timing to said phase.

14. The phase current adjuster of claim 9, further comprising a fault latch configured to provide overpower protection to said phase current adjuster.

15. The phase current adjuster of claim 9, wherein said phase adjuster circuit and said multi-phase converter are packaged on a single semiconductor die.

16. A method for adjusting a phase current of a phase of a multi-phase converter for use by a phase current adjuster, said method comprising:
   producing a differential signal based on a comparison of said phase current with an average current of said multi-phase converter; and
   adjusting said phase current based on a second comparison of said differential signal and a clocked ramp signal.

17. The method of claim 16, further comprising changing a duty cycle of a pulse width modulator based on said second comparison of said differential signal and said clocked ramp signal.

18. The method of claim 17, wherein said adjusting said phase current further comprises switching a switch of said pulse width modulator.

19. The method of claim 16, further comprising providing a delayed timing to said phase.

20. The method of claim 16, further comprising providing overpower protection to said phase current adjuster.

\* \* \* \* \*